(12) United States Patent
Otsu

(10) Patent No.: US 11,181,721 B2
(45) Date of Patent: Nov. 23, 2021

(54) IMAGING OPTICAL SYSTEM AND IMAGING DEVICE INCLUDING IMAGING OPTICAL SYSTEM COMPRISING SEVEN LENSES OF ---++-+ REFRACTIVE POWERS

(71) Applicant: NISSEI TECHNOLOGY CORPORATION, Hyogo (JP)

(72) Inventor: Takuya Otsu, Tokyo (JP)

(73) Assignee: NISSEI TECHNOLOGY CORPORATION, Hyogo (JP)

( * ) Notice: Subject to any disclaimer, the term of this patent is extended or adjusted under 35 U.S.C. 154(b) by 210 days.

(21) Appl. No.: 16/656,240

(22) Filed: Oct. 17, 2019

(65) Prior Publication Data
US 2020/0049960 A1    Feb. 13, 2020

Related U.S. Application Data

(63) Continuation of application No. PCT/JP2018/021386, filed on Jun. 4, 2018.

(51) Int. Cl.
*G02B 13/06* (2006.01)
*G02B 9/64* (2006.01)
*G02B 13/18* (2006.01)

(52) U.S. Cl.
CPC .............. *G02B 13/06* (2013.01); *G02B 9/64* (2013.01); *G02B 13/18* (2013.01)

(58) Field of Classification Search
CPC ........... G02B 13/06; G02B 9/64; G02B 13/18
See application file for complete search history.

(56) References Cited

U.S. PATENT DOCUMENTS

| 2007/0139793 | A1 | 6/2007 | Kawada |
| 2012/0056978 | A1* | 3/2012 | Abe ................ G02B 13/06 348/36 |
| 2017/0146778 | A1 | 5/2017 | Jeong et al. |

FOREIGN PATENT DOCUMENTS

| JP | 2007-164079 A | 6/2007 |
| JP | 2008-134494 A | 6/2008 |
| JP | 2010-256627 A | 11/2010 |

(Continued)

OTHER PUBLICATIONS

International Search Report issued in PCT/JP2018/021386 dated Sep. 11, 2018 with English Translation (5 pages).

(Continued)

*Primary Examiner* — Wen Huang
(74) *Attorney, Agent, or Firm* — Nakanishi IP Associates, LLC

(57) ABSTRACT

A wide-angle imaging optical system obtains sufficient information in the image periphery, and achieves high-performance imaging across the entire field of view. The imaging optical system uses stereographic projection, and includes, in sequence from an object, a first lens with a negative refractive power having a convex surface facing the object, a second lens with a negative refractive power, a third lens with a negative refractive power, a fourth lens with a positive refractive power, an aperture stop, a fifth lens with a positive refractive power, a sixth lens with a negative refractive power, and a seventh lens with a positive refractive power.

6 Claims, 10 Drawing Sheets

(56) References Cited

FOREIGN PATENT DOCUMENTS

JP  2014-240993 A  12/2014
WO  2015/190783 A1  12/2015

OTHER PUBLICATIONS

Written Opinion of International Searching Authority issued in PCT/JP2018/021386 dated Sep. 11, 2018 (3 pages).
Written Opinion of International Searching Authority issued in PCT/JP2018/021386 dated Sep. 11, 2018 with English Translation (7 pages).

* cited by examiner

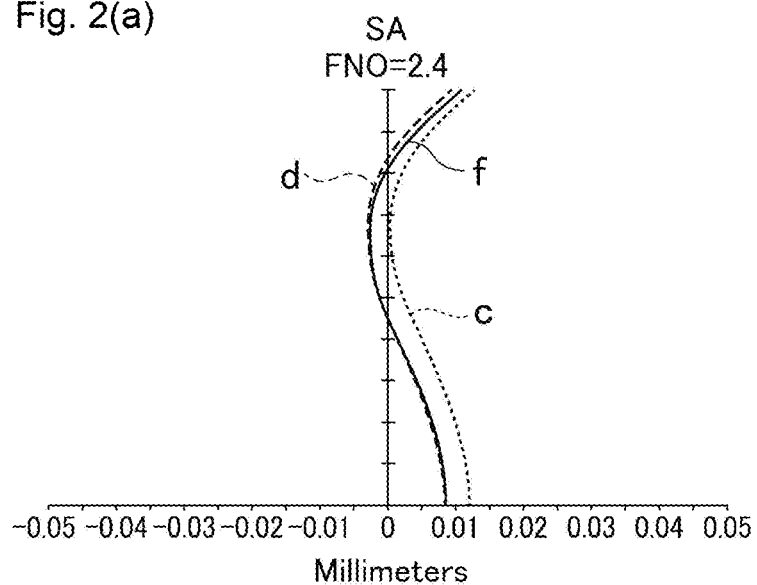
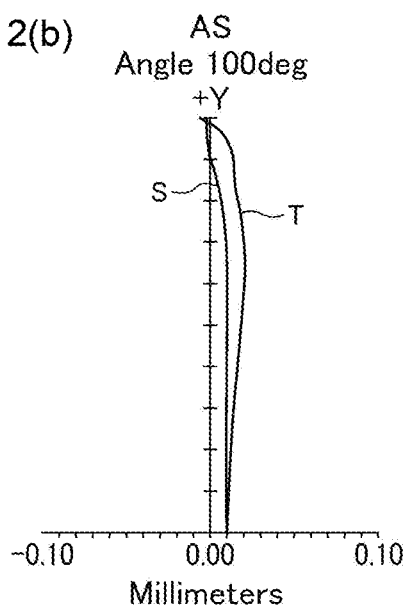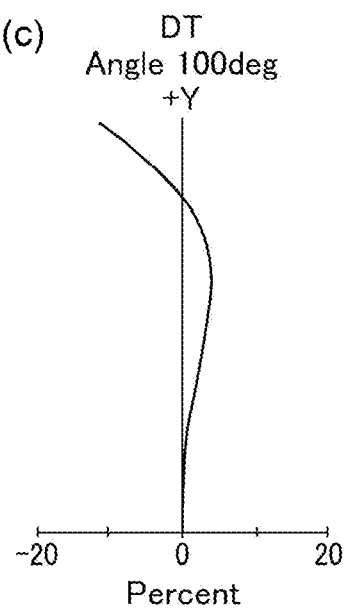

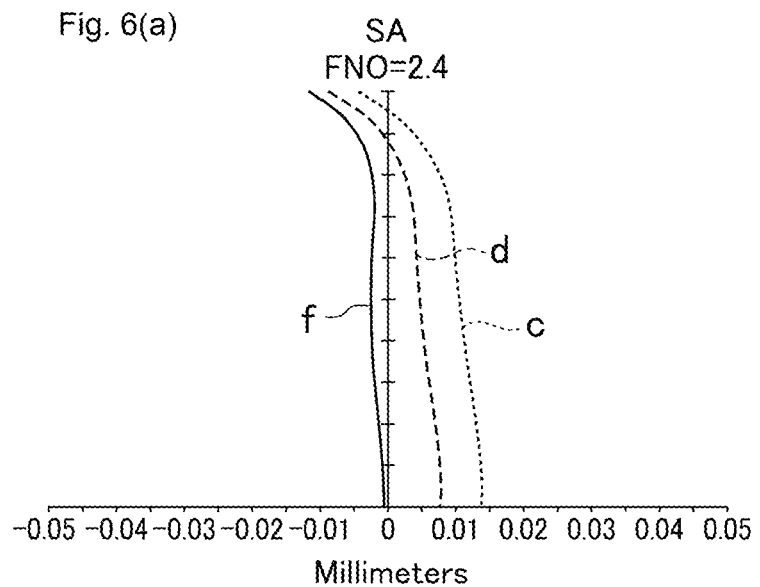
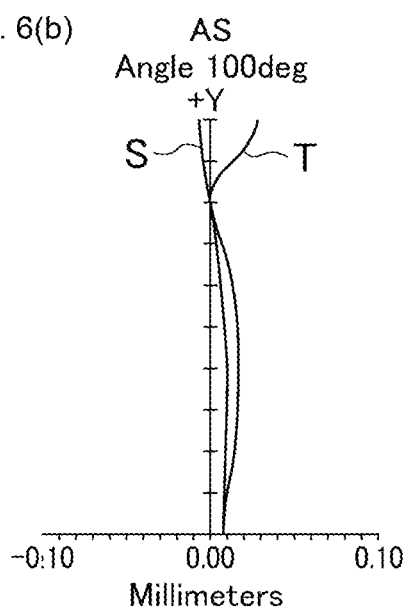
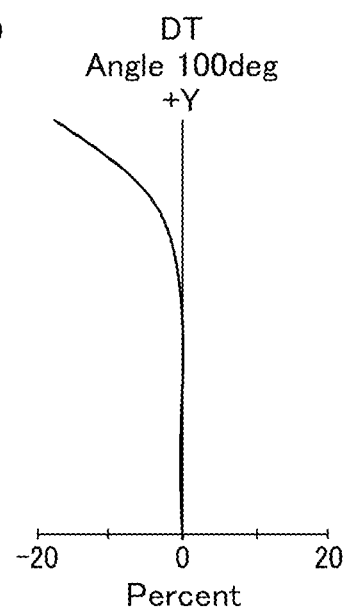

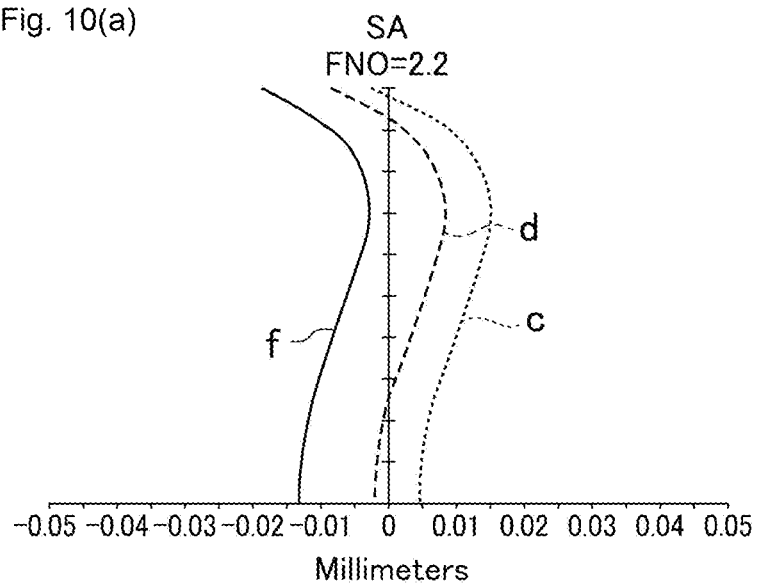
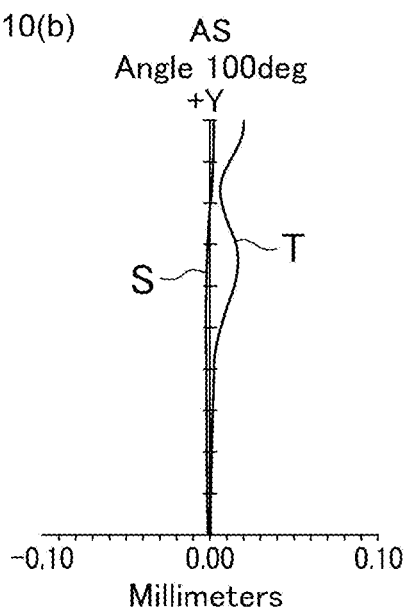
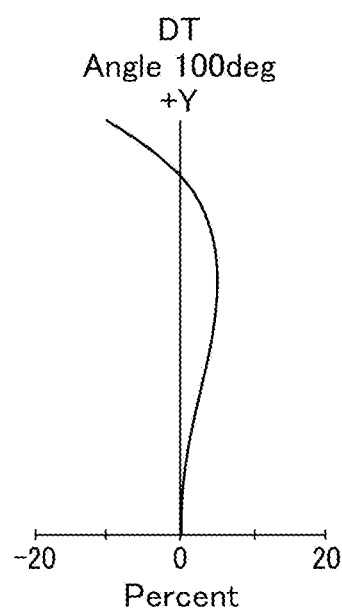

IMAGING OPTICAL SYSTEM AND IMAGING DEVICE INCLUDING IMAGING OPTICAL SYSTEM COMPRISING SEVEN LENSES OF −−−++−+ REFRACTIVE POWERS

CROSS-REFERENCE TO RELATED APPLICATIONS

This application is a continuation application of International Patent Application No. PCT/JP2018/021386 filed on Jun. 4, 2018, the entire content of which is incorporated by reference.

BACKGROUND OF INVENTION

Field of the Invention

The present invention relates to an imaging optical system using stereographic projection with a field of view exceeding 180 degrees and an imaging device including the imaging optical system.

Background Art

A known wide-angle imaging optical system captures images with a wide imaging range. An imaging optical system using stereographic projection is one such imaging optical system for obtaining sufficient information in the image periphery (refer to, for example, Patent Literature 1 and Patent Literature 2).

CITATION LIST

Patent Literature

Patent Literature 1: Japanese Unexamined Patent Application Publication No. 2010-256627
Patent Literature 2: Japanese Unexamined Patent Application Publication No. 2008-134494

Nowadays, cameras for recording videos such as dashboard cameras are mounted on, for example, vehicles. Cameras for security are also installed at public facilities, on roads, and in other places. Such cameras have an increasing demand for higher image quality, and are expected to achieve both a wide imaging area and high-quality imaging across the entire field of view.

Further, an imaging optical system used for day and night cameras achieving both color reproducibility for the daytime and low-light performance for the nighttime uses a space accommodating a mechanism for attaching and detaching optical elements including an infrared cut-off filter.

SUMMARY OF INVENTION

One or more aspects of the present invention are directed to a wide-angle imaging optical system that captures images with a wide imaging range while obtaining sufficient information in the image periphery and achieving high-performance imaging across the entire field of view, and an imaging device including the imaging optical system. Other aspects of the present invention are directed to an imaging optical system having an enough space accommodating a mechanism for attaching and detaching various optical elements including an infrared cut-off filter, and an imaging device including the imaging optical system.

An imaging optical system using stereographic projection with a field of view exceeding 180 degrees according to a first aspect of the present invention includes, in sequence from an object, a first lens with a negative refractive power having a convex surface facing the object, a second lens with a negative refractive power, a third lens with a negative refractive power, a fourth lens with a positive refractive power, an aperture stop, a fifth lens with a positive refractive power, a sixth lens with a negative refractive power, and a seventh lens with a positive refractive power. The imaging optical system satisfies the conditional expressions:

$$-23 < f1/f < -12 \quad (1)$$

$$-8 < f2/f < -5 \quad (2)$$

$$2.5 < f5/f < 4.5 \quad (3)$$

$$-3.0 < f6/f < -1.9 \quad (4)$$

where f is a focal length of the entire imaging optical system, f1 is a focal length of the first lens, f2 is a focal length of the second lens, f5 is a focal length of the fifth lens, and f6 is a focal length of the sixth lens.

An imaging optical system according to a second aspect of the present invention is the imaging optical system according to the first aspect that may satisfy the conditional expression:

$$-0.02 < n6 - n5 < 0.16 \quad (5)$$

where n5 is a refractive index of the fifth lens for a d-line, and n6 is a refractive index of the sixth lens for the d-line.

An imaging optical system according to a third aspect of the present invention is the imaging optical system according to the first or second aspect that may satisfy the conditional expression:

$$2.4 < f7/f < 3.0 \quad (6)$$

where f7 is a focal length of the seventh lens.

An imaging optical system according to a fourth aspect of the present invention is the imaging optical system according to any one of the first to third aspects in which the second lens includes a concave surface facing the object.

An imaging optical system according to a fifth aspect of the present invention is the imaging optical system according to any one of the first to fourth aspects in which the fifth lens includes optical glass.

An imaging device according to a sixth aspect of the present invention includes the imaging optical system according to any one of the first to fifth aspects, and a solid-state image sensor.

The wide-angle imaging optical system according to the above aspects of the present invention captures images with a wide imaging range while obtaining sufficient information in the image periphery and achieving high-performance imaging across the entire field of view. The imaging optical system according to the above aspects of the present invention has an enough space accommodating a mechanism for attaching and detaching various optical elements including an infrared cut-off filter.

BRIEF DESCRIPTION OF THE DRAWINGS

FIG. 2(a) is a diagram showing spherical aberration (SA), FIG. 2(b) is a diagram showing astigmatism (AS), and FIG.

2(c) is a diagram showing distortion (DT) of the imaging optical system according to the first embodiment focused on an object point at infinity.

Figure 3:
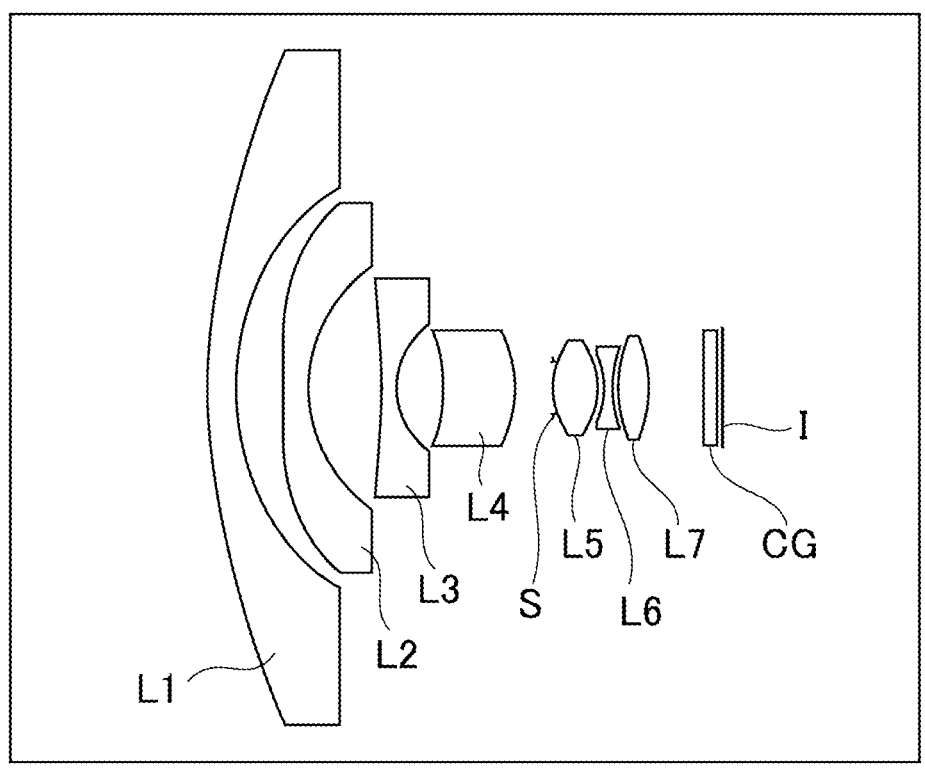

FIG. 3 is a cross-sectional view taken along an optical axis of an imaging optical system according to a second embodiment of the present invention showing its optical structure.

Figure 4A:
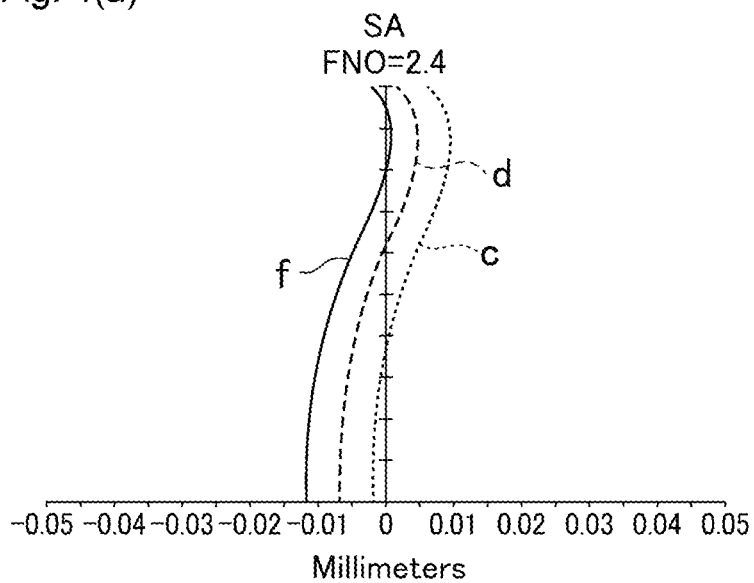
Figure 4B:
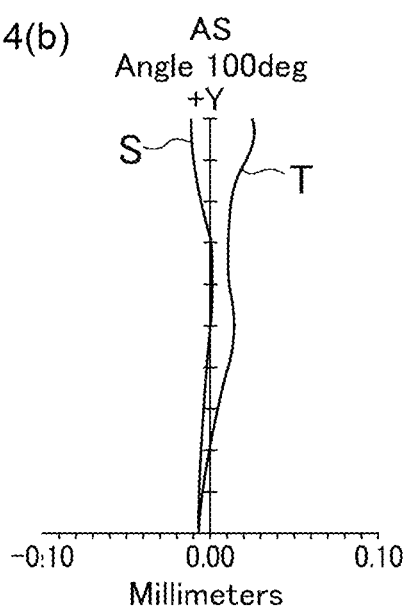
Figure 4C:
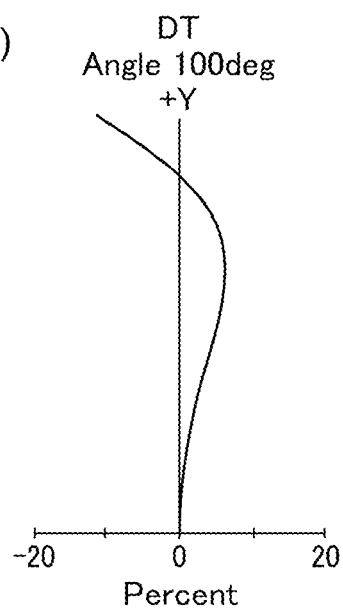

FIG. 4(a) is a diagram showing spherical aberration (SA), FIG. 4(b) is a diagram showing astigmatism (AS), and FIG. 4(c) is a diagram showing distortion (DT) of the imaging optical system according to the second embodiment focused on an object point at infinity.

Figure 5:
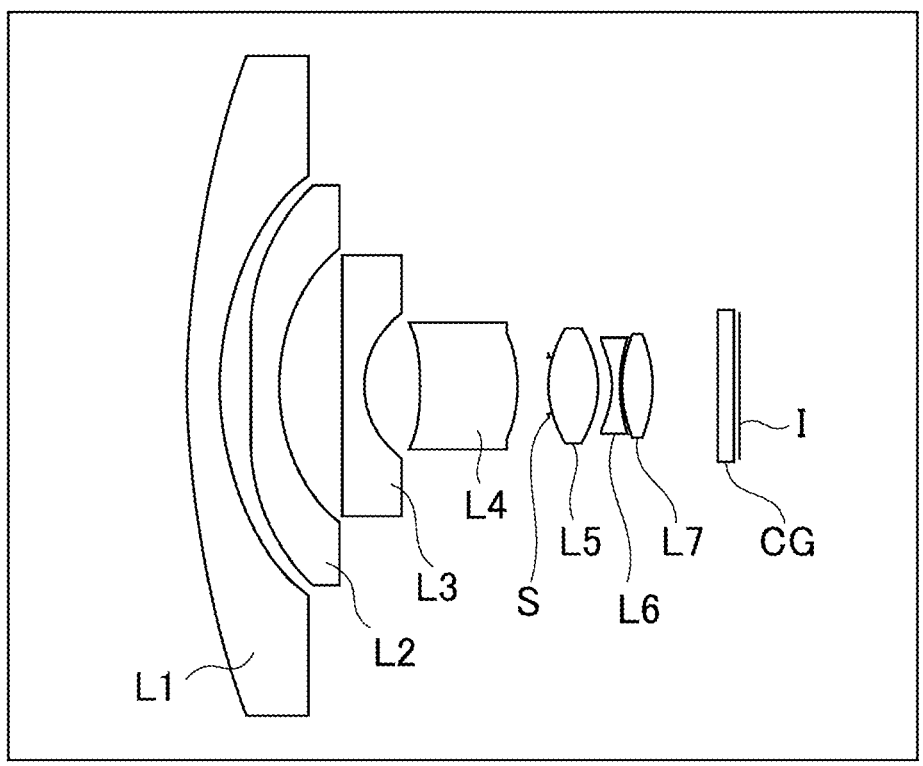

FIG. 5 is a cross-sectional view taken along an optical axis of an imaging optical system according to a third embodiment of the present invention showing its optical structure.

FIG. 6(a) is a diagram showing spherical aberration (SA), FIG. 6(b) is a diagram showing astigmatism (AS), and FIG. 6(c) is a diagram showing distortion (DT) of the imaging optical system according to the third embodiment focused on an object point at infinity.

Figure 7:
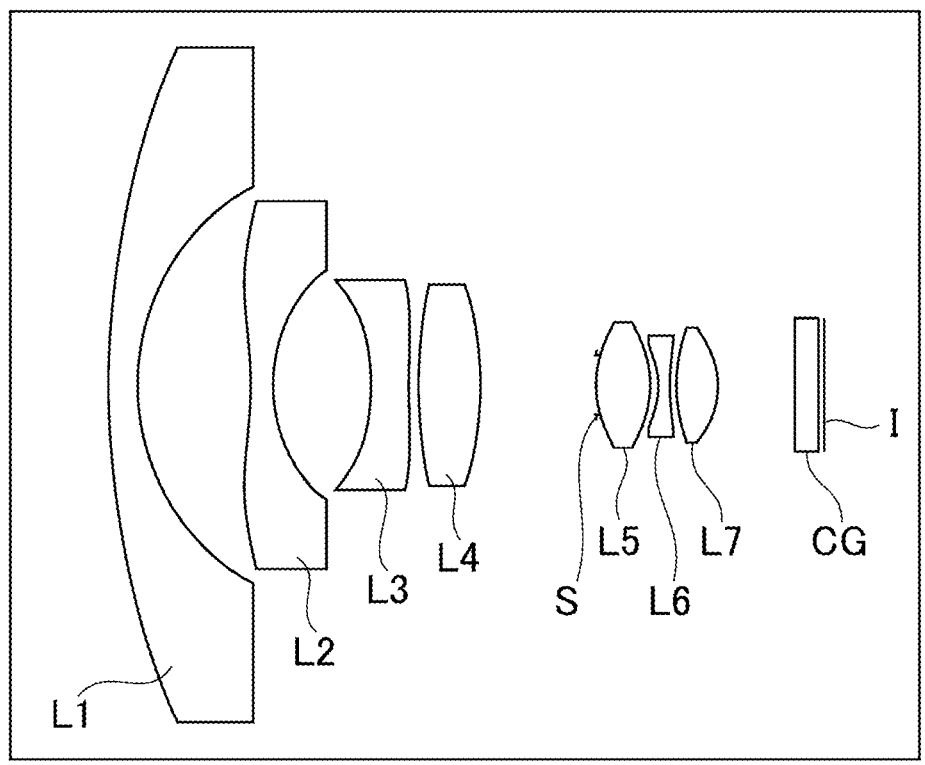

FIG. 7 is a cross-sectional view taken along an optical axis of an imaging optical system according to a fourth embodiment of the present invention showing its optical structure.

Figure 8A:
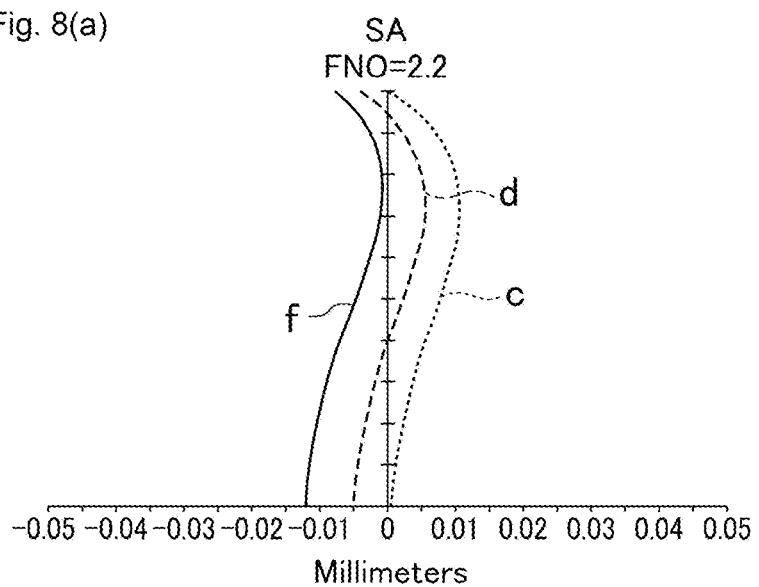
Figure 8B:
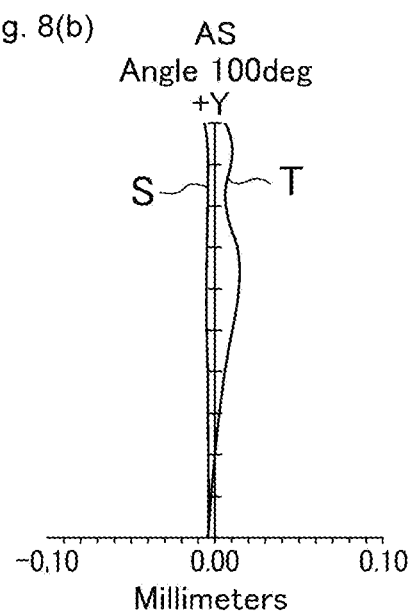
Figure 8C:
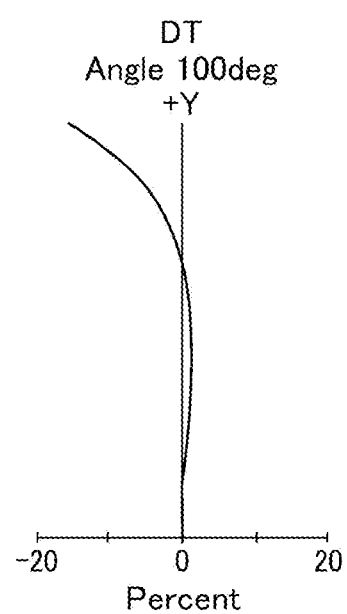

FIG. 8(a) is a diagram showing spherical aberration (SA), FIG. 8(b) is a diagram showing astigmatism (AS), and FIG. 8(c) is a diagram showing distortion (DT) of the imaging optical system according to the fourth embodiment focused on an object point at infinity.

Figure 9:
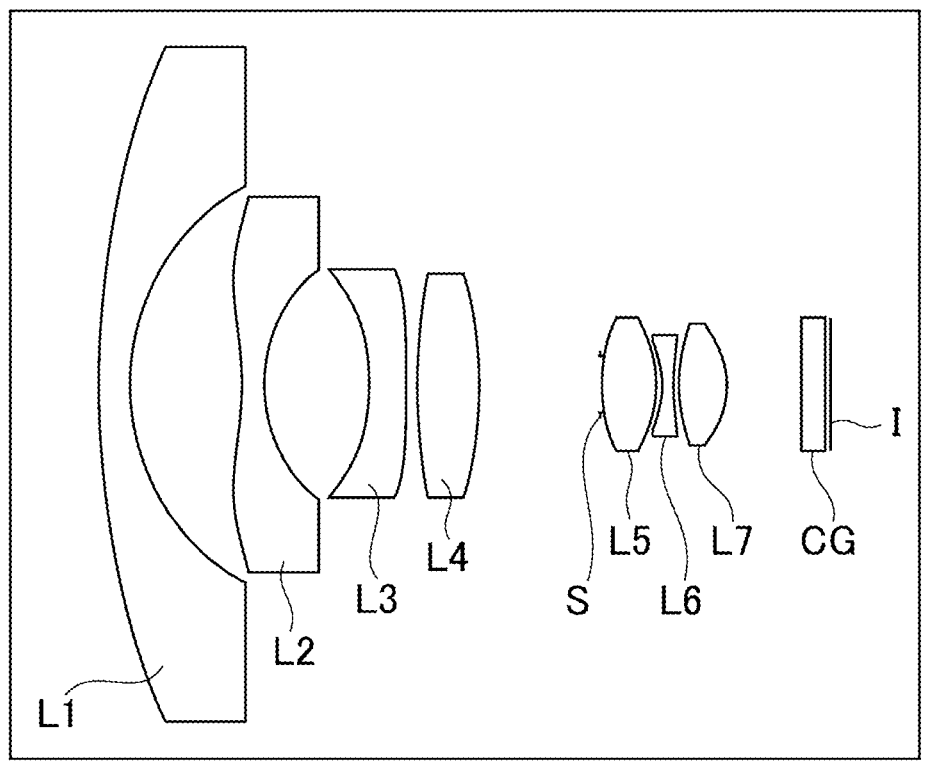

FIG. 9 is a cross-sectional view taken along an optical axis of an imaging optical system according to a fifth embodiment of the present invention showing its optical structure.

FIG. 10(a) is a diagram showing spherical aberration (SA), FIG. 10(b) is a diagram showing astigmatism (AS), and FIG. 10(c) is a diagram showing distortion (DT) of the imaging optical system according to the fifth embodiment focused on an object point at infinity.

DETAILED DESCRIPTION

One or more embodiments of the present invention will now be described with reference to the drawings.

Figure 1:
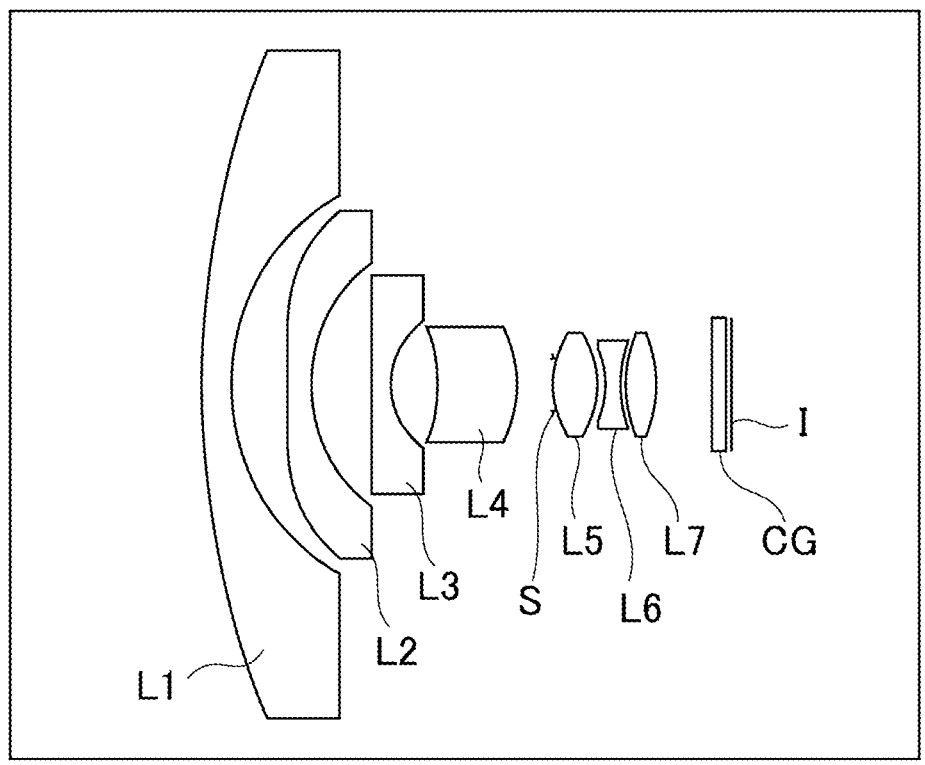
FIG. 1 is a cross-sectional view taken along an optical axis of an imaging optical system according to a first embodiment of the present invention showing its optical structure.

FIG. 1 is a cross-sectional view taken along an optical axis of an imaging optical system according to one embodiment of the present invention showing its optical structure. The optical structure shown in FIG. 1 corresponds to an optical structure according to a first embodiment.

The imaging optical system according to the present embodiment includes, in sequence from an object, a first lens L1 as a meniscus with a negative refractive power having its convex surface facing the object, a second lens L2 with a negative refractive power, a third lens L3 with a negative refractive power, a fourth lens L4 with a positive refractive power, an aperture stop S, a fifth lens L5 with a positive refractive power, a sixth lens L6 with a negative refractive power, and a seventh lens L7 with a positive refractive power.

In each of the embodiments below, CG is a cover glass, and I is the image surface of an image sensor in the cross-sectional view showing the optical structure.

The imaging optical system according to the present embodiment includes an image sensor, such as a charge-coupled device (CCD) on the image surface I. The imaging optical system may also include a mechanism for attaching and detaching various optical elements including an infrared cut-off filter between the seventh lens L7 and the cover glass CG.

The imaging optical system according to one or more embodiments of the present invention uses stereographic projection to obtain sufficient information (visibility) in the image periphery in a wide field of view.

In the imaging optical system according to the present embodiment, the first lens and the fifth lens are formed from glass, and at least the second lens may be an aspherical plastic lens.

The imaging optical system according to the present embodiment achieves stereographic projection with a field of view exceeding 180 degrees with a front lens group including the first to fourth lenses L1 to L4, and effectively corrects aberrations in images formed using such wide-angle stereographic projection using a rear lens group including the fifth to seventh lenses L5 to L7. In the imaging optical system according to the present embodiment, the rear lens group includes the fifth lens formed from glass as described above. This structure prevents fluctuations in aberrations depending on the temperature environment, and reliably corrects aberrations in the imaging optical system.

Further, the second lens L2 includes a concave surface near the optical axis to face the object. This structure extends the distance on the optical axis between the image surface and the surface of the seventh lens L7 facing the image surface (back focal distance), and can thus provide a space accommodating a mechanism for attaching and detaching various optical elements including an infrared cut-off filter between the seventh lens L7 and the cover glass CG.

The imaging optical system according to the present embodiment satisfies the following conditional expressions:

$$-23<f1/f<-12 \tag{1}$$

$$-8<f2/f<-5 \tag{2}$$

$$2.5<f5/f<4.5 \tag{3}$$

$$-3.0<f6/f<-1.9 \tag{4}$$

In these expressions,
f is the focal length of the entire imaging optical system,
f1 is the focal length of the first lens,
f2 is the focal length of the second lens,
f5 is the focal length of the fifth lens, and
f6 is the focal length of the sixth lens.

Conditional expressions (1) to (4) are defined to enable wide-angle imaging using stereographic projection while reducing aberrations.

The imaging optical system according to the present embodiment satisfies the following conditional expression:

$$-0.02<n6-n5<0.16 \tag{5}$$

In this expression,
n5 is the refractive index of the fifth lens for the d-line, and
n6 is the refractive index of the sixth lens for the d-line.

The imaging optical system according to the present embodiment also satisfies the following conditional expression:

$$2.4<f7/f<3.0 \tag{6}$$

In this expression,
f7 is the focal length of the seventh lens.

The conditional expression (5) is defined to reduce a difference in the refractive index between the fifth lens and the sixth lens by selecting appropriate glass materials for the fifth lens L5 and the sixth lens L6 and thus appropriately correct the field curvature aberration of the optical system. Further, the conditional expression (6) defined for the seventh lens is also used to correct the field curvature aberration of the optical system more appropriately.

The imaging device according to one or more embodiments of the present invention includes the imaging optical system according to one or more embodiments of the present invention, and a solid-state image sensor such as a charge-coupled device (CCD) or a complementary metal oxide semiconductor (CMOS).

Embodiments

Numerical working examples of the imaging optical system according to the embodiments of the present invention will now be described in detail. In the embodiments, the symbols below are used.

f: focal length of the entire imaging optical system
FNO: f-number
FOV (2ω): field of view
r: paraxial radius of curvature
d: thickness of a lens or an air space on the optical axis
nd: refractive index of a lens material for the d-line
vd: Abbe number of a lens material In the embodiments, the surfaces with numbers followed by * are aspherical.

The shape of an aspherical surface is expressed by the following formula (I), where z is the optical axis direction, y is the direction perpendicular to the optical axis, K is the conic constant, and A4, A6, A8, A10, . . . are aspheric coefficients.

$$z=(y^2/r)/[1+\{1-(1+K)(y/r)^2\}^{1/2}]+A4y^4+A6y^6+A8y^8+A10y^{10} \quad (I)$$

For the aspheric coefficients, E represents a power of 10. For example, $2.3 \times 10^{-2}$ is written as 2.3E-002. These symbols used for the specification values are also used commonly for numerical data in the embodiments described later.

First Embodiment

An imaging optical system according to a first embodiment will now be described.

FIG. 1 is a cross-sectional view taken along the optical axis of the imaging optical system according to the first embodiment showing its optical structure.

FIG. 2(a) is a diagram showing spherical aberration (SA), FIG. 2(b) is a diagram showing astigmatism (AS), and FIG. 2(c) is a diagram showing distortion (DT) of the imaging optical system according to the first embodiment focused on an object point at infinity. In the figures, Y is the image height. The symbols used in the figures showing SA, AS, and DT are also used commonly in the embodiments described later.

As shown in FIG. 1, the imaging optical system includes, in sequence from an object, a first lens L1 as a meniscus with a negative refractive power having its convex surface facing the object, a second lens L2 with a negative refractive power with a concave surface near the optical axis facing the object, a third lens L3 with a negative refractive power, a fourth lens L4 with a positive refractive power, an aperture stop S, a fifth lens L5 with a positive refractive power, a sixth lens L6 with a negative refractive power having both sides being concave, and a seventh lens L7 with a positive refractive power having both sides being convex.

The imaging optical system according to the first embodiment has the overall specifications below:

f: 1.41 mm
FNO: 2.40
FOV (2ω): 200.00°

The imaging optical system according to the first embodiment has surface data described below (in mm):

TABLE 1

Lens Data in First Embodiment

| | r | d | nd | vd |
|---|---|---|---|---|
| 1 | 36.125 | 1.445 | 1.540 | 59.5 |
| 2 | 9.102 | 2.715 | | |
| 3* | −47.894 | 1.204 | 1.534 | 56.2 |
| 4* | 5.626 | 3.020 | | |
| 5* | 118.728 | 0.963 | 1.544 | 56.2 |
| 6* | 3.651 | 2.228 | | |
| 7* | −14.133 | 3.868 | 1.635 | 23.9 |
| 8* | −5.051 | 1.802 | | |
| Aperture | | −0.083 | | |
| 10 | 3.805 | 2.216 | 1.497 | 81.5 |
| 11 | −3.805 | 0.435 | | |
| 12* | −4.252 | 0.722 | 1.649 | 21.5 |
| 13* | 4.213 | 0.193 | | |
| 14* | 4.754 | 1.626 | 1.544 | 56.2 |
| 15* | −3.625 | 2.615 | | |
| 16 | | 0.800 | 1.517 | 64.2 |
| 17 | | 0.100 | | |
| Image surface | | | | |

The imaging optical system according to the first embodiment has aspherical surface data described below:
Third surface
K=0
A4=1.536E-003, A6=−1.751E-005, A8=1.240E-007
Fourth surface
K=0
A4=−2.337E-003, A6=2.002E-004, A8=−5.741E-006
Fifth surface
K=0
A4=−7.238E-004, A6=1.894E-005, A8=2.413E-007
Sixth surface
K=0
A4=7.762E-003, A6=−8.094E-004, A8=3.592E-005
Seventh surface
K=0
A4=−4.132E-003, A6=−4.829E-004, A8=1.851E-005
Eighth surface
K=0
A4=−1.128E-003, A6=2.332E-004, A8=−9.641E-006
12th surface
K=0
A4=−1.359E-002, A6=−2.113E-004, A8=2.842E-004, A10=−7.497E-004, A12=2.668E-004
13th surface
K=0
A4=−1.084E-002, A6=2.829E-003, A8=−1.047E-003, A10=1.730E-004, A12=−6.323E-006
14th surface
K=0
A4=−1.066E-002, A6=1.421E-003, A8=8.494E-005, A10=−4.719E-005, A12=5.737E-006
15th surface
K=0
A4=3.301E-004, A6=−4.694E-004, A8=1.674E-004, A10=2.976E-006, A12=2.162E-006

The conditional expressions (1) to (4) for the imaging optical system according to the first embodiment yield the values below:

$$f1/f=-16.27 \quad (1)$$

$$f2/f=-6.63 \quad (2)$$

$$f5/f=3.00 \tag{3}$$

$$f6/f=-2.24 \tag{4}$$

$$n6-n5=0.15 \tag{5}$$

$$f7/f=2.88 \tag{6}$$

In the imaging optical system according to the first embodiment, the first lens and the fifth lens are formed from a glass material, and the other lenses are formed from a plastic material.

Second Embodiment

An imaging optical system according to a second embodiment will now be described.

FIG. 3 is a cross-sectional view taken along the optical axis of the imaging optical system according to the second embodiment showing its optical structure.

FIG. 4(a) is a diagram showing spherical aberration (SA), FIG. 4(b) is a diagram showing astigmatism (AS), and FIG. 4(c) is a diagram showing distortion (DT) of the imaging optical system according to the second embodiment focused on an object point at infinity. In the figures, Y is the image height.

As shown in FIG. 3, the imaging optical system includes, in sequence from an object, a first lens L1 as a meniscus with a negative refractive power having its convex surface facing the object, a second lens L2 with a negative refractive power with a concave surface near the optical axis facing the object, a third lens L3 with a negative refractive power, a fourth lens L4 with a positive refractive power, an aperture stop S, a fifth lens L5 with a positive refractive power, a sixth lens L6 with a negative refractive power having both sides being concave, and a seventh lens L7 with a positive refractive power having both sides being convex.

The imaging optical system according to the second embodiment has the overall specifications below:
f: 1.45 mm
FNO: 2.40
FOV (2ω): 200.00°

The imaging optical system according to the second embodiment has surface data described below (in mm):

TABLE 2

Lens Data in Second Embodiment

|  | r | d | nd | vd |
|---|---|---|---|---|
| 1 | 36.000 | 1.500 | 1.540 | 59.5 |
| 2 | 11.650 | 2.501 |  |  |
| 3* | −33.904 | 1.250 | 1.544 | 56.2 |
| 4* | 6.486 | 4.006 |  |  |
| 5* | −33.959 | 1.000 | 1.544 | 56.2 |
| 6* | 3.691 | 2.301 |  |  |
| 7* | −27.717 | 4.003 | 1.635 | 23.9 |
| 8* | −5.745 | 2.154 |  |  |
| Aperture |  | 0.000 |  |  |
| 10 | 3.941 | 2.298 | 1.497 | 81.5 |
| 11 | −3.941 | 0.437 |  |  |
| 12* | −4.253 | 0.497 | 1.635 | 23.9 |
| 13* | 3.766 | 0.134 |  |  |
| 14* | 3.632 | 1.832 | 1.544 | 56.2 |
| 15* | −4.311 | 2.853 |  |  |
| 16 |  | 0.800 | 1.517 | 64.2 |
| 17 |  | 0.100 |  |  |
| Image surface |  |  |  |  |

The imaging optical system according to the second embodiment has aspherical surface data described below:
Third surface
K=0
A4=1.130E-003, A6=−1.039E-005, A8=4.932E-008
Fourth surface
K=0
A4=−1.643E-003, A6=1.228E-004, A8=−2.519E-006
Fifth surface
K=0
A4=−3.266E-004, A6=2.495E-005, A8=−2.675E-007
Sixth surface
K=0
A4=5.975E-003, A6=−9.557E-004, A8=4.175E-005
Seventh surface
K=0
A4=−3.140E-003, A6=−5.222E-004, A8=2.730E-005
Eighth surface
K=0
A4=−9.075E-003, A6=8.271E-005, A8=1.933E-006
12th surface
K=0
A4=−1.405E-002, A6=9.911E-004, A8=4.864E-004, A10=−4.359E-004, A12=1.209E-004
13th surface
K=0
A4=−1.232E-002, A6=1.415E-003, A8=−3.683E-004, A10=6.337E-005, A12=1.551E-006
14th surface
K=0
A4=−9.145E-003, A6=2.898E-004, A8=2.352E-005, A10=−6.228E-006, A12=−1.434E-006
15th surface
K=0
A4=2.241E-003, A6=−1.824E-004, A8=1.492E-004, A10=9.869E-006, A12=−4.696E-006

The conditional expressions (1) to (4) for the imaging optical system according to the second embodiment yield the values below:

$$f1/f=-22.45 \tag{1}$$

$$f2/f=-6.82 \tag{2}$$

$$f5/f=3.02 \tag{3}$$

$$f6/f=-2.12 \tag{4}$$

$$n6-n5=0.14 \tag{5}$$

$$f7/f=2.72 \tag{6}$$

In the imaging optical system according to the second embodiment, the first lens and the fifth lens are formed from a glass material, and the other lenses are formed from a plastic material.

Third Embodiment

The imaging optical system according to a third embodiment will now be described.

FIG. 5 is a cross-sectional view taken along the optical axis of the imaging optical system according to the third embodiment showing its optical structure.

FIG. 6(a) is a diagram showing spherical aberration (SA), FIG. 6(b) is a diagram showing astigmatism (AS), and FIG. 6(c) is a diagram showing distortion (DT) of the imaging optical system according to the third embodiment focused on an object point at infinity. In the figures, Y is the image height.

As shown in FIG. 5, the imaging optical system includes, in sequence from an object, a first lens L1 as a meniscus with a negative refractive power having its convex surface facing the object, a second lens L2 with a negative refractive power with a concave surface near the optical axis facing the object, a third lens L3 with a negative refractive power, a fourth lens L4 with a positive refractive power, an aperture stop S, a fifth lens L5 with a positive refractive power, a sixth lens L6 with a negative refractive power having both sides being concave, and a seventh lens L7 with a positive refractive power having both sides being convex.

The imaging optical system according to the third embodiment has the overall specifications below:
f: 1.53 mm
FNO: 2.40
FOV (2ω): 200.00°

The imaging optical system according to the third embodiment has surface data described below (in mm):

TABLE 3

Lens Data in Third Embodiment

| | r | d | nd | vd |
|---|---|---|---|---|
| 1 | 31.522 | 1.500 | 1.540 | 59.5 |
| 2 | 10.721 | 1.514 | | |
| 3* | −55.000 | 1.250 | 1.544 | 56.2 |
| 4* | 7.279 | 2.727 | | |
| 5* | −84.998 | 1.000 | 1.544 | 56.2 |
| 6* | 3.661 | 2.439 | | |
| 7* | −12.696 | 4.485 | 1.635 | 23.9 |
| 8* | −5.371 | 1.414 | | |
| Aperture | | 0.000 | | |
| 10 | 3.941 | 2.298 | 1.497 | 81.5 |
| 11 | −3.941 | 0.535 | | |
| 12* | −4.275 | 0.351 | 1.635 | 23.9 |
| 13* | 3.463 | 0.040 | | |
| 14* | 3.909 | 1.409 | 1.544 | 56.2 |
| 15* | −3.686 | 2.853 | | |
| 16 | | 0.800 | 1.517 | 64.2 |
| 17 | | 0.100 | | |
| Image surface | | | | |

The imaging optical system according to the third embodiment has aspherical surface data described below:
Third surface
K=0
A4=1.076E-003, A6=−1.035E-005, A8=7.293E-008
Fourth surface
K=0
A4=−1.310E-003, A6=1.066E-004, A8=−2.098E-006
Fifth surface
K=0
A4=−3.286E-004, A6=2.405E-005, A8=−3.119E-007
Sixth surface
K=0
A4=5.806E-003, A6=−7.171E-004, A8=3.669E-005
Seventh surface
K=0
A4=−3.214E-003, A6=−4.535E-004, A8=4.060E-005
Eighth surface
K=0
A4=3.024E-004, A6=2.075E-004, A8=−2.456E-006
12th surface
K=0
A4=−1.562E-002, A6=9.400E-004, A8=5.674E-004, A10=−3.533E-004, A12=8.439E-005

13th surface
K=0
A4=−1.338E-002, A6=1.344E-003, A8=−3.617E-003, A10=6.042E-004, A12=−3.803E-006
14th surface
K=0
A4=−9.253E-003, A6=4.798E-004, A8=8.326E-005, A10=9.779E-006, A12=−1.839E-006
15th surface
K=0
A4=6.664E-004, A6=1.783E-004, A8=2.115E-004, A10=2.653E-005, A12=2.670E-006

The conditional expressions (1) to (4) for the imaging optical system according to the third embodiment yield the values below:

$$f1/f=-20.22 \quad (1)$$

$$f2/f=-7.68 \quad (2)$$

$$f5/f=2.87 \quad (3)$$

$$f6/f=-1.94 \quad (4)$$

$$n6-n5=0.14 \quad (5)$$

$$f7/f=2.44 \quad (6)$$

In the imaging optical system according to the third embodiment, the first lens and the fifth lens are formed from a glass material, and the other lenses are formed from a plastic material.

Fourth Embodiment

The imaging optical system according to a fourth embodiment will now be described.

FIG. 7 is a cross-sectional view taken along the optical axis of the imaging optical system according to the fourth embodiment showing its optical structure.

FIG. 8(a) is a diagram showing spherical aberration (SA), FIG. 8(b) is a diagram showing astigmatism (AS), and FIG. 8(c) is a diagram showing distortion (DT) of the imaging optical system according to the fourth embodiment focused on an object point at infinity. In the figures, Y is the image height.

As shown in FIG. 7, the imaging optical system includes, in sequence from an object, a first lens L1 as a meniscus with a negative refractive power having its convex surface facing the object, a second lens L2 with a negative refractive power with a concave surface near the optical axis facing the object, a third lens L3 with a negative refractive power, a fourth lens L4 with a positive refractive power, an aperture stop S, a fifth lens L5 with a positive refractive power, a sixth lens L6 with a negative refractive power having both sides being concave, and a seventh lens L7 with a positive refractive power having both sides being convex.

The imaging optical system according to the fourth embodiment has the overall specifications below:
f: 0.98 mm
FNO: 2.20
FOV (2ω): 200.00°

The imaging optical system according to the fourth embodiment has surface data described below (in mm):

TABLE 4

| Lens Data in Fourth Embodiment | | | | |
|---|---|---|---|---|
| | r | d | nd | vd |
| 1 | 24.432 | 1.000 | 1.720 | 50.2 |
| 2 | 6.500 | 3.700 | | |
| 3* | −10.463 | 0.704 | 1.544 | 56.2 |
| 4* | 4.020 | 3.238 | | |
| 5* | −9.027 | 1.250 | 1.544 | 56.2 |
| 6* | 12.728 | 0.370 | | |
| 7* | 15.872 | 2.037 | 1.635 | 23.9 |
| 8* | −6.437 | 3.799 | | |
| Aperture | | 0.000 | | |
| 10 | 4.414 | 1.700 | 1.651 | 56.2 |
| 11 | −4.414 | 0.300 | | |
| 12* | −2.100 | 0.450 | 1.635 | 23.9 |
| 13* | 6.431 | 0.150 | | |
| 14* | 3.822 | 1.416 | 1.544 | 56.2 |
| 15* | −1.992 | 2.436 | | |
| 16 | | 0.800 | 1.517 | 64.2 |
| 17 | | 0.100 | | |
| Image surface | | | | |

The imaging optical system according to the fourth embodiment has aspherical surface data described below:
Third surface
K=0
A4=3.345E-003, A6=−6.891E-005, A8=7.587E-007
Fourth surface
K=0
A4=−4.979E-003, A6=5.702E-004, A8=−2.068E-005
Fifth surface
K=0
A4=−1.333E-002, A6=1.056E-003, A8=−3.025E-005
Sixth surface
K=0
A4=−9.408E-003, A6=4.586E-004, A8=−7.702E-006
Seventh surface
K=0
A4=3.504E-003, A6=−4.639E-004, A8=1.234E-005
Eighth surface
K=0
A4=5.090E-003, A6=−2.766E-004, A8=2.752E-006
12th surface
K=0
A4=1.420E-002, A6=5.504E-003, A8=−6.112E-004
13th surface
K=0
A4=−2.883E-002, A6=2.488E-002, A8=−5.881E-003
14th surface
K=0
A4=−4.781E-002, A6=2.324E-002, A8=−4.097E-003
15th surface
K=0
A4=2.329E-002, A6=−9.893E-004, A8=1.709E-003

The conditional expressions (1) to (4) for the imaging optical system according to the fourth embodiment yield the values below:

$$f1/f = -12.88 \quad (1)$$

$$f2/f = -5.37 \quad (2)$$

$$f5/f = 3.75 \quad (3)$$

$$f6/f = -2.50 \quad (4)$$

$$n6 - n5 = -0.02 \quad (5)$$

$$f7/f = 2.69 \quad (6)$$

In the imaging optical system according to the fourth embodiment, the first lens and the fifth lens are formed from a glass material, and the other lenses are formed from a plastic material.

Fifth Embodiment

The imaging optical system according to a fifth embodiment will now be described.

FIG. 9 is a cross-sectional view taken along the optical axis of the imaging optical system according to the fifth embodiment showing its optical structure.

FIG. 10(a) is a diagram showing spherical aberration (SA), FIG. 10(b) is a diagram showing astigmatism (AS), and FIG. 10(c) is a diagram showing distortion (DT) of the imaging optical system according to the fifth embodiment focused on an object point at infinity. In the figures, Y is the image height.

As shown in FIG. 9, the imaging optical system includes, in sequence from an object, a first lens L1 as a meniscus with a negative refractive power having its convex surface facing the object, a second lens L2 with a negative refractive power with a concave surface near the optical axis facing the object, a third lens L3 with a negative refractive power, a fourth lens L4 with a positive refractive power, an aperture stop S, a fifth lens L5 with a positive refractive power, a sixth lens L6 with a negative refractive power having both sides being concave, and a seventh lens L7 with a positive refractive power having both sides being convex.

The imaging optical system according to the fifth embodiment has the overall specifications below:
f: 0.92 mm
FNO: 2.20
FOV (2ω): 200.00°

The imaging optical system according to the fifth embodiment has surface data described below (in mm):

TABLE 5

| Lens Data in Fifth Embodiment | | | | |
|---|---|---|---|---|
| | r | d | nd | vd |
| 1 | 26.181 | 1.000 | 1.720 | 50.2 |
| 2 | 6.490 | 3.700 | | |
| 3* | −10.360 | 0.691 | 1.544 | 56.2 |
| 4* | 3.967 | 3.427 | | |
| 5* | −8.745 | 1.250 | 1.544 | 56.2 |
| 6* | 14.602 | 0.370 | | |
| 7* | 15.912 | 2.086 | 1.635 | 23.9 |
| 8* | −6.301 | 3.971 | | |
| Aperture | | 0.000 | | |
| 10 | 5.014 | 1.700 | 1.651 | 56.2 |
| 11 | −5.014 | 0.300 | | |
| 12* | −2.174 | 0.354 | 1.635 | 23.9 |
| 13* | 8.248 | 0.150 | | |
| 14* | 3.484 | 1.665 | 1.544 | 56.2 |
| 15* | −1.991 | 2.366 | | |
| 16 | | 0.800 | 1.517 | 64.2 |
| 17 | | 0.100 | | |
| Image surface | | | | |

The imaging optical system according to the fifth embodiment has aspherical surface data described below:
Third surface
K=0
A4=3.291E-003, A6=−6.832E-005, A8=7.455E-007
Fourth surface
K=0
A4=−6.794E-003, A6=7.016E-004, A8=−3.043E-005

Fifth surface
K=0
A4=−1.318E-002, A6=1.050E-003, A8=−3.091E-005
Sixth surface
K=0
A4=−9.549E-003, A6=4.430E-004, A8=−9.188E-006
Seventh surface
K=0
A4=3.530E-003, A6=−4.726E-004, A8=1.185E-005
Eighth surface
K=0
A4=5.178E-003, A6=−2.727E-004, A8=3.212E-006
12th surface
K=0
A4=1.391E-002, A6=6.171E-003, A8=1.022E-003
13th surface
K=0
A4=−3.023E-002, A6=2.507E-002, A8=−5.824E-003
14th surface
K=0
A4=−4.734E-002, A6=2.309E-002, A8=−4.098E-003
15th surface
K=0
A4=2.966E-002, A6=−1.207E-003, A8=1.902E-003

The conditional expressions (1) to (4) for the imaging optical system according to the fifth embodiment yield the values below:

$$f1/f=-13.30 \tag{1}$$

$$f2/f=-5.63 \tag{2}$$

$$f5/f=4.48 \tag{3}$$

$$f6/f=-2.90 \tag{4}$$

$$n6-n5=-0.02 \tag{5}$$

$$f7/f=2.83 \tag{6}$$

In the imaging optical system according to the fifth embodiment, the first lens and the fifth lens are formed from a glass material, and the other lenses are formed from a plastic material.

REFERENCE SIGNS LIST

L1 first lens
L2 second lens
L3 third lens
L4 fourth lens
L5 fifth lens
L6 sixth lens
L7 seventh lens
CG cover glass
I image surface
S aperture stop

The invention claimed is:

1. An imaging optical system using stereographic projection with a field of view exceeding 180 degrees, the system comprising, in sequence from an object:
   a first lens with a negative refractive power having a convex surface facing the object;
   a second lens with a negative refractive power;
   a third lens with a negative refractive power;
   a fourth lens with a positive refractive power;
   an aperture stop;
   a fifth lens with a positive refractive power;
   a sixth lens with a negative refractive power; and
   a seventh lens with a positive refractive power,
   wherein the imaging optical system satisfies the conditional expressions:

$$-23<f1/f<-12 \tag{1}$$

$$-8<f2/f<-5 \tag{2}$$

$$2.5<f5/f<4.5 \tag{3}$$

$$-3.0<f6/f<-1.9 \tag{4}$$

where f is a focal length of the entire imaging optical system,
f1 is a focal length of the first lens,
f2 is a focal length of the second lens,
f5 is a focal length of the fifth lens, and
f6 is a focal length of the sixth lens.

2. The imaging optical system according to claim 1 satisfying the conditional expression:

$$-0.02<n6-n5<0.16 \tag{5}$$

where n5 is a refractive index of the fifth lens for a d-line, and
n6 is a refractive index of the sixth lens for the d-line.

3. The imaging optical system according to claim 1, satisfying the conditional expression:

$$2.4<f7/f<3.0 \tag{6}$$

where f7 is a focal length of the seventh lens.

4. The imaging optical system according to claim 1, wherein
the second lens includes a concave surface facing the object.

5. The imaging optical system according to claim 1, wherein
the fifth lens comprises optical glass.

6. An imaging device, comprising:
the imaging optical system according to claim 1; and
a solid-state image sensor.

* * * * *